(12) United States Patent
Taylor et al.

(10) Patent No.: US 6,312,507 B1
(45) Date of Patent: Nov. 6, 2001

(54) ELECTRO-KINETIC IONIC AIR REFRESHENER-CONDITIONER FOR PET SHELTER AND LITTER BOX

(75) Inventors: Charles E. Taylor, Sebastopol; Shek Fai Lau, Foster City, both of CA (US)

(73) Assignee: Sharper Image Corporation, San Francisco, CA (US)

( * ) Notice: Subject to any disclaimer, the term of this patent is extended or adjusted under 35 U.S.C. 154(b) by 0 days.

(21) Appl. No.: 09/249,375

(22) Filed: Feb. 12, 1999

(51) Int. Cl.[7] ....................................................... B03C 3/68
(52) U.S. Cl. ............................... 96/19; 55/385.1; 95/3; 96/65; 96/77; 96/96; 96/97; 119/165; 119/420; 119/500; 422/5; 422/120; 422/186.07; 422/186.1
(58) Field of Search ....................... 96/15, 18, 19, 96/65, 77, 80, 96, 97, 226; 95/2, 3, 57, 78; 55/385.1, 385.2; 204/176; 422/3–5, 120, 186.1, 186.07; 361/226, 231, 232; 119/165, 420, 500

(56) References Cited

U.S. PATENT DOCUMENTS

| | | | |
|---|---|---|---|
| 2,590,447 | | 3/1952 | Nord et al. .............................. 607/79 |
| 3,725,737 | * | 4/1973 | Lawson et al. ....................... 361/226 |
| 4,227,894 | * | 10/1980 | Proynoff ............................. 361/231 X |
| 4,477,263 | * | 10/1984 | Shaver et al. ..................... 361/231 X |
| 4,496,375 | * | 1/1985 | LeVantine ............................ 96/77 X |
| 4,632,135 | | 12/1986 | Lenting et al. ...................... 132/313 |
| 4,643,745 | * | 2/1987 | Sakakibara et al. ..................... 96/76 |
| 4,713,724 | * | 12/1987 | Voelkel ............................. 361/232 X |
| 4,789,801 | | 12/1988 | Lee ....................................... 310/308 |
| 4,811,159 | * | 3/1989 | Foster, Jr. ............................ 361/231 |
| 4,941,068 | * | 7/1990 | Hofmann ............................ 361/231 |
| 5,024,685 | * | 6/1991 | Torok et al. ......................... 96/96 X |
| 5,072,746 | | 12/1991 | Kantor ................................. 132/219 |
| 5,141,529 | * | 8/1992 | Oakley et al. ................... 55/385.2 X |
| 5,215,558 | * | 6/1993 | Moon ....................................... 96/62 |
| 5,386,839 | | 2/1995 | Chen ................................... 132/152 |
| 5,484,472 | * | 1/1996 | Weinberg ............................ 96/80 X |

(List continued on next page.)

OTHER PUBLICATIONS

"Zenion Elf Device" drawing, Zenion Industries, Inc. (Undated).
Electrical Schematic and promotional material available from Zenion Industries, 7 pages. (Aug. 1990).
Promotional material available from Zenion Industries for the Plasma–Pure 100/200/300, 2 pages. (Aug. 1990).
Promotional material available from Zenion Industries for the Plasma–Tron, 2 pages. (Aug. 1990).

*Primary Examiner*—Richard L. Chiesa

(57) ABSTRACT

A hand-holdable electro-kinetic electro-static ionic air refreshener-conditioner for a pet shelter or litter box includes a self-contained ion generator that provides electro-kinetically moved air with ions and safe amounts of ozone. The ion generator includes a high voltage pulse generator whose output pulses are coupled between first and second electrode arrays. Preferably the first array comprises one or more pin-like electrodes and the second array comprises one more washer-like electrodes. Preferably a ratio between effective area of an electrode in the second array compared to effective area of an electrode in the first array exceeds about 15:1 and preferably is about 20:1. An electric field produced by the high voltage pulses between the arrays produces an electrostatic flow of ionized air containing safe amounts of ozone. Optionally, a sensor detects odor adjacent the refreshener-conditioner causes the ion generator to be activated when sensed odor exceeds a predetermined threshold. Odor-activation of the ion generator can be open or closed loop. A bias electrode, electrically coupled to the second array electrodes, affects net polarity of ions generated. The outflow of ionized air and ozone is thus conditioned.

22 Claims, 13 Drawing Sheets

U.S. PATENT DOCUMENTS

| | | | | |
|---|---|---|---|---|
| 5,535,089 | * | 7/1996 | Ford et al. | 361/231 |
| 5,569,368 | | 10/1996 | Larsky et al. | 204/600 |
| 5,601,636 | * | 2/1997 | Glucksman | 96/80 X |
| 5,656,063 | * | 8/1997 | Hsu | 422/4 X |
| 5,702,507 | * | 12/1997 | Wang | 422/186.1 X |
| 5,778,822 | * | 7/1998 | Giffin et al. | 119/165 |
| 5,779,769 | * | 7/1998 | Jiang | 96/55 |
| 5,975,090 | * | 11/1999 | Taylor et al. | 132/116 |
| 6,126,722 | * | 10/2000 | Mitchell et al. | 95/57 |
| 6,163,098 | * | 12/2000 | Taylor et al. | 96/15 X |
| 6,176,977 | * | 1/2001 | Taylor et al. | 204/176 |

* cited by examiner

ELECTRO-KINETIC IONIC AIR REFRESHENER-CONDITIONER FOR PET SHELTER AND LITTER BOX

FIELD OF THE INVENTION

This invention relates to reducing odor and the presence of undesirable parasites (germs, bacteria, fleas) from a pet container such as a litter box or shelter kennel, and more particularly to methods and devices for electro-kinetically producing a flow of air from such containers, from which particulate matter has been substantially removed, odors and the presence of parasites are removed. Preferably the air flow should contain safe amounts of ozone ($O_3$).

BACKGROUND OF THE INVENTION

Pets can be welcome members to a household, but often pet containers such as a pet kennel or house or litter box can become malodorous. In addition to taking on the animal's odor, such containers may shelter fleas and other parasites brought in by the animal. In the case of litter boxes, unless the litter material is replaced sufficiently frequently, animal waste can create not only an unpleasant odor but a potential health hazard as well.

Electric motor driven fan blades may be used to create an air flow to air out the animal house or little box, but such fans are noisy, and can present an danger to children from moving fan blades and AC voltage used to power the fan. Further, with respect to odors, a fan merely dissipates the odor into the nearby environment without addressing the cause of the odor, which may include germs and bacteria.

It is known to produce an air flow using electro-kinetic techniques, by which electrical power is directly converted into a flow of air without mechanically moving components. One such system is described in U.S. Pat. No. 4,789,801 to Lee (1988), depicted herein in simplified form as FIGS. 1A and 1B. Lee's system 10 includes an array of small area ("minisectional") electrodes 20 that is spaced-apart symmetrically from an array of larger area ("maxisectional") electrodes 30. The positive terminal of a pulse generator 40 that outputs a train of high voltage pulses (e.g., 0 to perhaps +5 KV) is coupled to the minisectional array, and the negative pulse generator terminal is coupled to the maxisectional array.

The high voltage pulses ionize the air between the arrays, and an air flow 50 from the minisectional array toward the maxisectional array results, without requiring any moving parts. Particulate matter 60 in the air is entrained within the airflow 50 and also moves towards the maxisectional electrodes 30. Much of the particulate matter is electrostatically attracted to the surface of the maxisectional electrode array, where it remains, thus conditioning the flow of air exiting system 10. Further, the high voltage field present between the electrode arrays can release ozone into the ambient environment, which appears to destroy or at least alter whatever is entrained in the airflow, including for example, bacteria.

In the embodiment of FIG. 1A, minisectional electrodes 20 are circular in cross-section, having a diameter of about 0.003" (0.08 mm), whereas the maxisectional electrodes 30 are substantially larger in area and define a "teardrop" shape in cross-section. The ratio of cross-sectional areas between the maxisectional and minisectional electrodes is not explicitly stated, but from Lee's figures appears to exceed 10:1. As shown in FIG. 1A herein, the bulbous front surfaces of the maxisectional electrodes face the minisectional electrodes, and the somewhat sharp trailing edges face the exit direction of the air flow. The "sharpened" trailing edges on the maxisectional electrodes apparently promote good electrostatic attachment of particular matter entrained in the airflow. Lee does not disclose how the teardrop shaped maxisectional electrodes are fabricated, but presumably they are produced using a relatively expensive mold-casting or an extrusion process.

In another embodiment shown herein as FIG. 1B, Lee's maxisectional sectional electrodes 30 are symmetrical and elongated in cross-section. The elongated trailing edges on the maxisectional electrodes provide increased area upon which particulate matter entrained in the airflow can attach. Lee states that precipitation efficiency and desired reduction of anion release into the environment can result from including a passive third array of electrodes 70. Understandably, increasing efficiency by adding a third array of electrodes will contribute to the cost of manufacturing and maintaining the resultant system.

Lee's electrostatic techniques offer advantage over conventional electric fans, but Lee's maxisectional electrodes are relatively expensive to fabricate. It is also difficult to increase efficiency in a Lee-type system without including a third array of electrodes.

Thus, there is a need for an electro-kinetic air transporter-conditioner that can be produced in a format suitable for deodorizing, conditioning, and ionizing the area within an animal house and/or a litter box. Such a device should provide improved efficiency over Lee-type systems, without requiring expensive production techniques to fabricate the electrodes. Preferably such a conditioner should function efficiently without requiring a third array of electrodes. Further, such a device should optionally generate safe amounts of ozone, for example to remove odor from ambient air. Preferably such a device should be manufacturable in a portable size, for example for use within a closed closet.

The present invention provides a method and apparatus for electro-kinetically transporting and conditioning air. Device embodiments are described to provide a flow of air that can contain ions and safe amounts of ozone, to deodorize and otherwise condition the air in the environment of an animal house and/or litter box. Further, such devices may be battery operated, to promote safety and portability.

SUMMARY OF THE PRESENT INVENTION

The present invention provides an electro-kinetic system for transporting and conditioning air without moving parts, for use with a pet container such as a litter box, an animal shelter or kennel. The air is conditioned in the sense that it is ionized and contains safe amounts of ozone.

The electro-kinetic air transporter-conditioner system is attached to an animal container such as a lather or kennel, and includes a compact louvered or grilled body that houses a battery-operated ionizer unit. The ionizer unit includes a high voltage DC inverter that boosts battery voltage to high voltage. The ionizer unit further includes a generator that receives the high voltage DC and outputs high voltage pulses of perhaps 10 KV peak-to-peak, although an essentially 100% duty cycle (e.g., high voltage DC) output could be used instead of pulses. The unit also includes an electrode assembly unit comprising first and second spaced-apart arrays of conducting electrodes, the first array and second array being coupled, respectively, preferably to the positive and negative output ports of the high voltage generator.

If desired, the present invention may be energized whenever detected odor in a litter box or kennel becomes excessive. In a litter box application, for example, an ammonia sensor is disposed within the system to detect $NH_3$ emanating from the litter box. When excess $NH_3$ is detected, the sensor output can command the ionizer unit to operate, either for a predetermined time or, using feedback, for as long as it takes for sensed $NH_3$ to drop below a desired threshold. Other sensor(s) may be used as sensed operation (with or without feedback) may be used in a kennel type application as well.

In the various embodiments, the electrode assembly preferably is formed using first and second arrays of readily manufacturable electrode types. In one assembly embodiment, the first array comprises wire-like electrodes and the second array comprises "U"-shaped electrodes having one or two trailing surfaces. In another embodiment, the first array includes at least one pin or cone-like electrode and the second array is an annular washer-like electrode. The electrode assembly may comprise various combinations of the described first and second array electrodes. In the various embodiments, the ratio between effective area of the second array electrodes to the first array electrodes is at least about 20:1.

The high voltage creates an electric field between the first and second electrode arrays. This field produces an electro-kinetic airflow going from the first array toward the second array, the airflow being rich in preferably a net surplus of negative ions and in ozone. Ambient air including dust particles and other undesired components (germs, perhaps) enter the housing through the grill or louver openings, and ionized clean air (with ozone) exits through openings on the downstream side of the housing.

The dust and other particulate matter attaches electrostatically to the second array (or collector) electrodes, and the output air is substantially clean of such particulate matter. Further, ozone generated by the present invention can kill certain types of germs and the like, and also eliminates odors in the output air. Preferably the transporter operates in periodic bursts, and a control permits the user to temporarily increase the high voltage pulse generator output, e.g., to more rapidly eliminate odors in the environment.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1A:
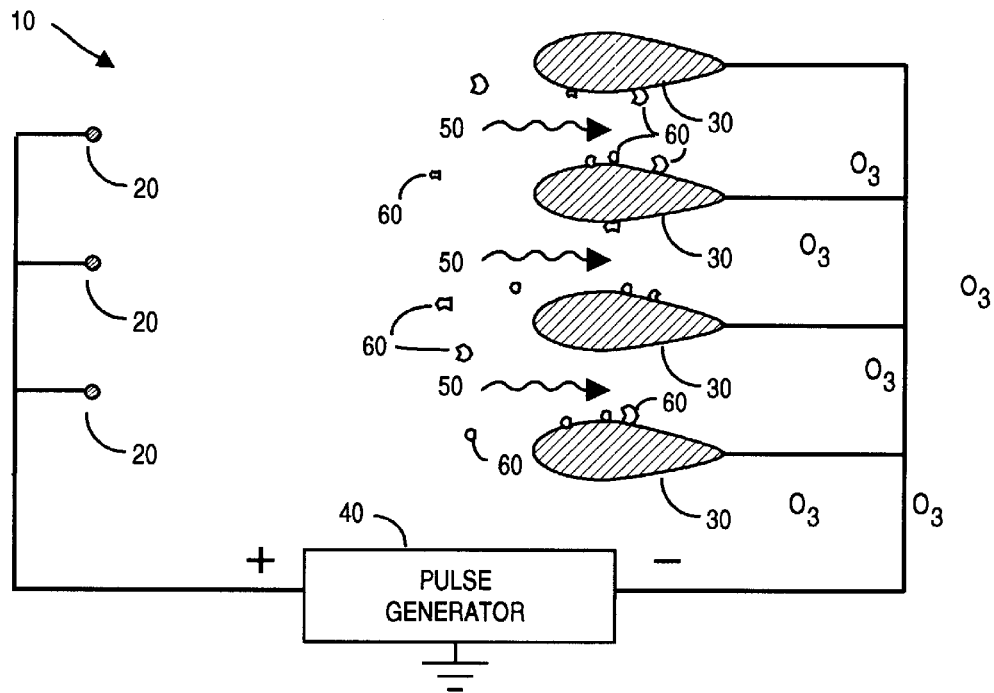
FIG. 1A is a plan, cross-sectional view, of a first embodiment of a prior art electro-kinetic air transporter-conditioner system, according to the prior art.
Figure 1B:
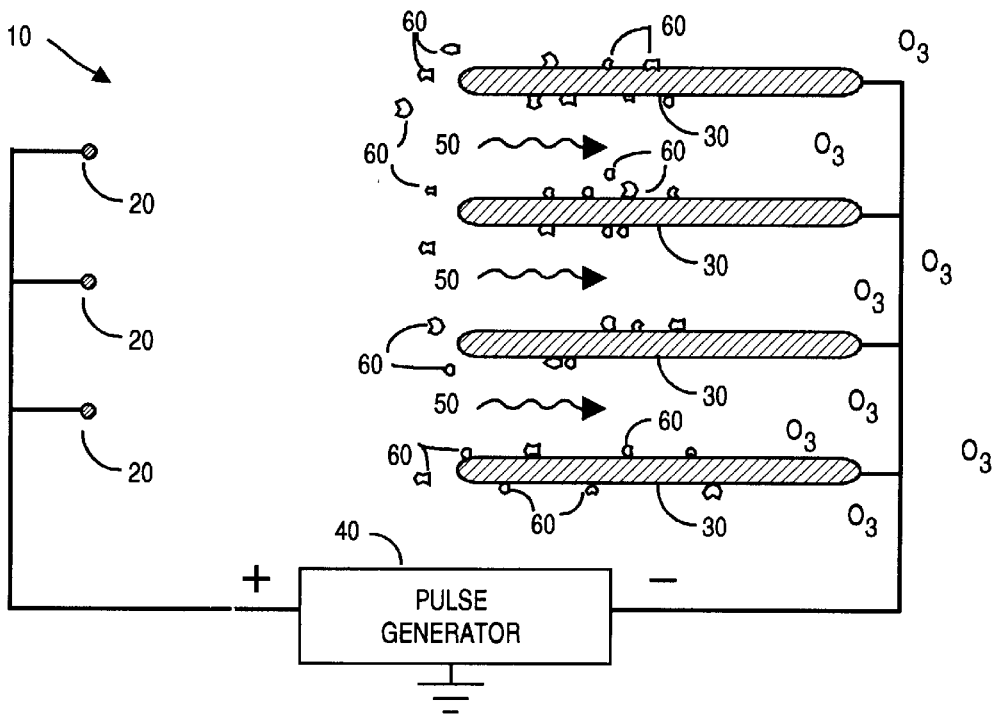
FIG. 1B is a plan, cross-sectional view, of a second embodiment of a prior art electro-kinetic air transporter-conditioner system, according to the prior art.
Figures 2A, 2B:
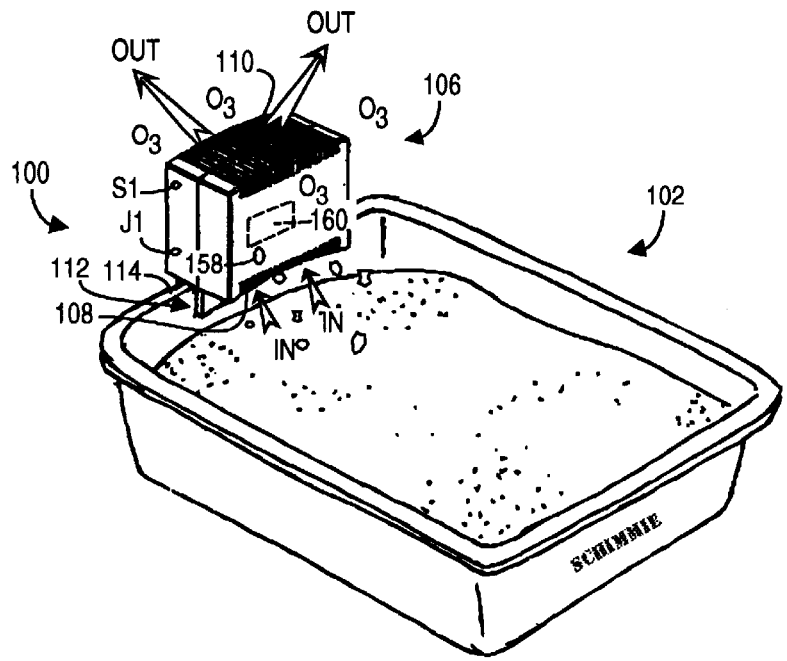
FIG. 2A is an perspective view of the present invention used in conjunction with a litter box.
FIG. 2B is a perspective view of the present invention used in conjunction with an animal shelter.

FIGS. 2A and 2B the present invention, an electro-kinetic air transporter-conditioner system 100, used to freshen and condition air associated with an animal litter box 102 (FIG. 2A) and/or associated with an animal shelter or house 104 (FIG. 2B). System 100 is contained in a housing 106 that provides preferably bottom and front surface located intake vents or louvers 108 and preferably top surface located exhaust vents 110. In a litter box application, system 100 preferably includes an odor sensor 158 that is coupled to an ion generating unit 160, described below. For example, sensor 158 can detect when ammonia ($NH_3$) adjacent the litter box exceeds a predetermined threshold. When so detected, a signal from sensor 158 can command unit 160 to generate ions, which will reduce the odor. If desired, an odor sensor function may also be used in a kennel application such as shown in FIG. 2B.

Figure 2C:
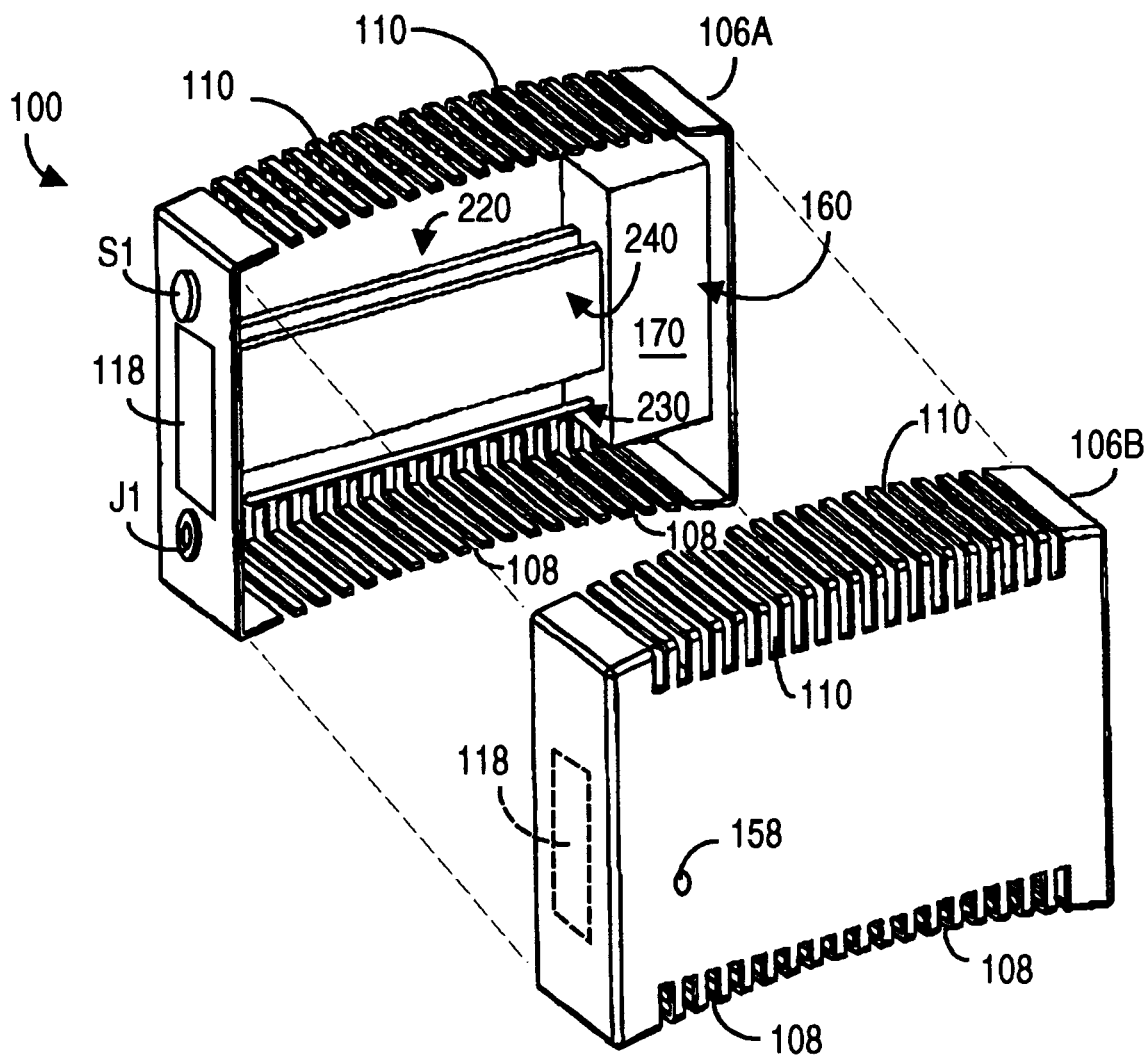
FIG. 2C is an exploded view of an embodiment of the present invention adapted for use with a litter box and/or an animal shelter.

Referring now also to FIG. 2C, housing 106 may comprise housing halves 106A and 106B that can be disassembled to provide access to the components within. Housed within is an ion generating unit 160 that comprises a high voltage generator unit 170 coupled to an electrode assembly 220 comprising first and second electrode arrays 230, 240. Unit 160 receives DC operating power from a battery (B1) contained within housing 106. Alternatively, AC voltage that is conditioned by an AC:DC power converter (not shown) may be coupled to housing 106 via an input jack J1 to power unit 160. Switch S1 energizes ion generating unit 160 by completing or closing the input power circuit.

As will be described, this low voltage DC operating potential is increased in magnitude by high voltage generator unit 170, whose high voltage output is coupled to the electrode assembly 220. The high voltage produces ions, a controlled amount of ozone ($O_3$), and an electrostatic flow of air into and through housing 106. Particulate matter (dust, etc.) in the incoming air (denoted "IN") will electrostatically be retained within the electrode assembly, and the outflow air (denoted "OUT") will be ionized and can contain safe amounts of ozone. The result is to deodorize and filter the air associated with the lather, animal shelter or other animal compartment. Further, the ozone may retard the growth or even kill germs, bacteria associated with the lather or shelter. Preferably ion generating unit 160 is self-contained in that nothing besides ambient air is required from beyond the housing 106 to operate the present invention.

The form factor and dimensions of housing 106 are not critical. In a preferred embodiment, a holder 112 preferably is removably affixed to the lower surface of housing 106 to attach housing 106 to a litter box 102 (FIG. 2A), to an animal housing 104 (FIG. 2B), or indeed to another animal product whose surrounding air may be beneficially conditioned by the present invention. In FIG. 2A, attachment 112 preferably resembles an inverted "U" and is used to clamp housing 106 to a sidewall 114 of lather 102. In FIG. 2B, a different attachment 112 may be used, an attachment that can clip or snap on to a grill 116 found in the upper surface of shelter 104. The variously shaped attachment(s) 112 may themselves be removably affixed to the underside of housing 106 in a variety of ways including snap connectors, slide connectors, thumb screws, magnets, Velcro, etc. Understandably different mechanical attachments 116 may be employed and system 100 could be dedicated for use with a litter box or with an animal house.

The top-to-bottom height of housing 106 is not critical, and preferably is about 12 cm, with a left-to-right width of perhaps 16 cm, and a front-to-back depth of perhaps 6 cm, although other dimensions and shapes may of course be used. A louvered construction provides ample inlet and outlet venting in an economical housing configuration.

There need be no real distinction between vents 108 and 110 except their location relative to the second array of electrodes within the housing. If desired, a common vent could be used for input and for output flow. The vents serve to ensure that an adequate flow of ambient air may be drawn into the present invention, and that an adequate flow of ionized air that includes safe amounts of O₃ electrostatically flows out from the present invention. In the embodiments of FIGS. 2A and 2B, the various vents are defined as openings between louvers. Of course, a grill-like construction or a panel with discrete holes or other openings may instead be used.

Figure 3:
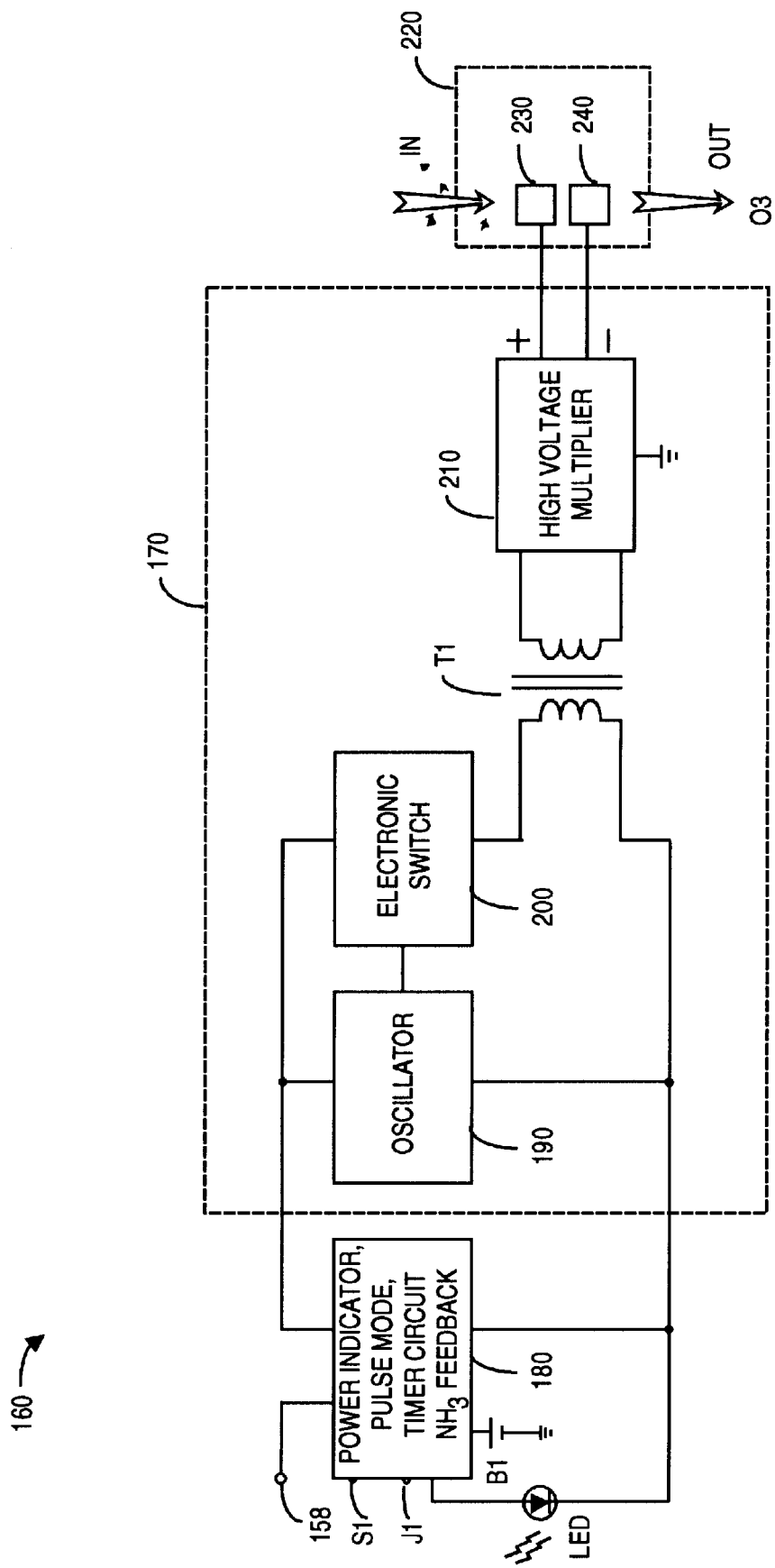
FIG. 3 is a generic electrical block diagram of the present invention.

FIG. 3 shows a block diagram of a preferred embodiment of ion generating unit 160. Unit 160 preferably includes a circuit 180 that can signal the status of operating potential. For example a light emitting diode ("LED") can signal that voltage on internally housed battery B1 is too low to operate the invention, and should be replaced. Circuit 180 can also provide a timer function such that a user can press or otherwise activate switch S1 to cause ion generating unit 160 to function for a predetermined amount of time, perhaps 10 minutes. If desired, circuit 180 could periodically command unit 160 to operate for a predetermined amount of time, e.g., perhaps five minute bursts of operation once per hour. If desired, a control can be provided to permit a user to command a sudden burst of ionized air from the invention, which mode can also be controlled and signalled by circuit 180.

As noted, output from an optional odor detector 158 can cause circuit 180 to command operation of ion generator unit 160. Unit 160 can be commanded to operate for a predetermined time (e.g., five minutes), or to operate for whatever time is required to bring the level of the detected odor below a desired threshold. Such a feedback embodiment will preferably provide a measure of hysteresis such that unit 160 does not continuously turn on for a few seconds, turn off for a few seconds, on for a few seconds, etc. as the detected level of odor hovers right at a single threshold level. In a preferred environment, the detected odor characteristic is ammonia, although one or more other odor components could instead (or in addition) be sensed.

High voltage generator unit 170 preferably comprises a low voltage oscillator circuit 190 operating at perhaps 20 KHz frequency. Oscillation frequency is not critical but preferably exceeds at least about 20 KHz to be inaudible to humans and not discomforting to pets who might howl or otherwise be disruptive if the oscillations could be heard.

Oscillator 190 outputs low voltage pulses to an electronic switch 200, e.g., a thyristor or the like, that switchably couples the low voltage pulses to the input winding of a step-up transformer T1. The secondary winding of T1 is coupled to a high voltage multiplier circuit 210 that outputs high voltage pulses. Preferably the circuitry and components comprising high voltage pulse generator 170 and circuit 180 are fabricated on a printed circuit board that is mounted within housing 106.

Output pulses from high voltage generator 170 preferably are at least 10 KV peak-to-peak with an effective DC offset of perhaps half the peak-to-peak voltage, and have a frequency of perhaps 20 KHz. The pulse train output preferably has a duty cycle of perhaps 10%, which will promote battery lifetime. Of course, different peak—peak amplitudes, DC offsets, pulse train waveshapes, duty cycle, and/or repetition frequencies may instead be used. Indeed, a 100% pulse train (e.g., an essentially DC high voltage) may be used, albeit with shorter battery lifetime. Thus, generator unit 170 outputs high voltage that preferably is pulsed but may in fact be DC. Essentially unit 170 functions as a DC:DC high voltage generator, and could be implemented using circuitry and/or techniques other than what is shown in FIG. 3.

Output from high voltage pulse generator unit 170 is coupled to an electrode assembly 220 that comprises a first electrode array 230 and a second electrode array 240. In the embodiment of FIG. 3, the positive output terminal of unit 170 is coupled to first electrode array 230, and the negative output terminal is coupled to second electrode array 240. This coupling polarity has been found to work well, including minimizing unwanted audible electrode vibration or hum. An electrostatic flow of air is created, the flow travelling in the direction of the "IN" and "OUT" arrows shown in FIGS. 2A, 2B and 3. More specifically, the flow goes from the first electrode array towards the second electrode array. Accordingly electrode assembly 220 is mounted within housing 106 such that second electrode array 240 is closer to the OUT vents, while the first electrode array 230 is closer to the IN vents.

When high voltage from high voltage generator 170 is coupled across first and second electrode arrays 230 and 240, it is believed that a plasma-like field is created surrounding the electrodes (e.g., electrodes 232 in FIG. 4A) in first array 230. This electric field ionizes the ambient air between the first and second electrode arrays and establishes the airflow that moves towards the second array. As noted, the IN flow enters via the input vent(s) and the OUT flow exits via the output vent(s) 106.

It is believed that ozone and ions are generated simultaneously by the first array electrode(s), essentially as a function of the potential from generator 170 coupled to the first array. Ozone generation may be increased or decreased by increasing or decreasing the potential at the first array. Coupling an opposite polarity potential to the second array electrode(s) (e.g., electrodes 242 in FIG. 4A) essentially accelerates the motion of ions generated at the first array, producing the OUT air flow. As the ions move toward the second array, it is believed that they push or move air molecules toward the second array. The relative velocity of this motion may be increased by decreasing the potential at the second array relative to the potential at the first array.

For example, if +10 KV were applied to the first array electrode(s), and no potential were applied to the second array electrode(s), a cloud of ions (whose net charge is positive) would form adjacent the first electrode array. Further, the relatively high 10 KV potential would generate substantial ozone. By coupling a relatively negative potential to the second array electrode(s), the velocity of the air mass moved by the net emitted ions increases, as momentum of the moving ions is conserved.

On the other hand, if it were desired to maintain the same effective outflow (OUT) velocity but to generate less ozone, the exemplary 10 KV potential could be divided between the electrode arrays. For example, generator 170 could provide +4 KV (or some other fraction) to the first array electrode(s) and −6 KV (or some other fraction) to the second array electrode(s). In this example, it is understood that the +4 KV and the −6 KV are measured relative to ground. Understandably it is desired that the present invention operate to output safe amounts of ozone. Accordingly, the high voltage is preferably fractionalized with about +4 KV applied to the first array electrode(s) and about −6 KV applied to the second array electrodes.

As noted, outflow (OUT) preferably includes safe amounts of $O_3$ that can destroy or at least substantially alter bacteria, germs, and other living (or quasi-living) matter subjected to the outflow. Thus, when switch S1 is closed and B1 has sufficient operating potential, pulses from high voltage pulse generator unit 170 create an outflow (OUT) of ionized air and $O_3$.

When S1 is closed, LED will visually signal when ionization is occurring. In addition to moving stale air away from the pet container (e.g., lather 102, house or kennel 104), it is believed that ozone in the output air can not only reduce odors but can also retard the growth of germs and bacteria that may be detrimental to the pet and possibly to humans as well. Possibly the ionized ozone-containing air flow also is detrimental to fleas but this has not been quantized. The IN-to-OUT air flow is electro-kinetically produced in that there are no intentionally moving parts within the present invention. (As noted, some mechanical vibration may occur within the electrodes.) As will be described with respect to FIG. 4A, it is desirable that the present invention actually output a net surplus of negative ions, as these ions are deemed more beneficial to health than are positive ions.

Preferably operating parameters of the present invention are set during manufacture and are not user-adjustable. For example, increasing the peak-to-peak output voltage and/or duty cycle in the high voltage pulses generated by unit 170 can increase air flowrate, ion content, and ozone content. In the preferred embodiment, output flowrate is about 200 feet/minute, ion content is about 2,000,000/cc and ozone content is about 40 ppb (over ambient) to perhaps 2,000 ppb (over ambient). Decreasing the R2/R1 ratio below about 20:1 will decrease flow rate, as will decreasing the peak-to-peak voltage and/or duty cycle of the high voltage pulses coupled between the first and second electrode arrays.

As will be described, when unit 100 is energized, high voltage output by ion generator 160 produces ions at the first electrode array, which ions are attracted to the second electrode array. The movement of the ions in an "IN" to "OUT" direction carries with them air molecules, thus electrokinetically producing an outflow of ionized air. The "IN" notation in FIGS. 2A and 2C denote the intake of ambient air with particulate matter (dust, dirt, etc.) 60. The "OUT" notation in the figures denotes the outflow of cleaned air substantially devoid of the particulate matter, which adheres electrostatically to the surface of the second array electrodes. In the process of generating the ionized air flow, safe amounts of ozone ($O_3$) are beneficially produced. It may be desired to provide the inner surface of housing 102 with an electrostatic shield to reduce detectable electromagnetic radiation. For example, a metal shield could be disposed within the housing, or portions of the interior of the housing could be coated with a metallic paint to reduce such radiation.

Having described various aspects of the invention in general, preferred embodiments of electrode assembly 220 will now be described. In the various embodiments, electrode assembly 220 will comprise a first array 230 of at least one electrode 232, and will further comprise a second array 240 of preferably at least one electrode 242. Understandably material(s) for electrodes 232 and 242 should conduct electricity, be resilient to corrosive effects from the application of high voltage, yet be strong enough to be cleaned.

In the various electrode assemblies to be described herein, electrode(s) 232 in the first electrode array 230 are preferably fabricated from tungsten. Tungsten is sufficiently robust to withstand cleaning, has a high melting point to retard breakdown due to ionization, and has a rough exterior surface that seems to promote efficient ionization. On the other hand, electrodes 242 preferably will have a highly polished exterior surface to minimize unwanted point-to-point radiation. As such, electrodes 242 preferably are fabricated from stainless steel, brass, among other materials. The polished surface of electrodes 232 also promotes ease of electrode cleaning.

In contrast to the prior art electrodes disclosed by Lee, electrodes 232 and 242 according to the present invention are light weight, easy to fabricate, and lend themselves to mass production. Further, electrodes 232 and 242 described herein promote more efficient generation of ionized air, and production of safe amounts of ozone, $O_3$.

In the present invention, a high voltage pulse generator 170 is coupled between the first electrode array 230 and the second electrode array 240. The high voltage pulses produce a flow of ionized air that travels in the direction from the first array towards the second array (indicated herein by hollow arrows denoted "OUT"). As such, electrode(s) 232 may be referred to as an emitting electrode, and electrodes 242 may be referred to as collector electrodes. This outflow advantageously contains safe amounts of $O_3$, and exits the present invention from vent(s) 106.

According to the present invention, it is preferred that the positive output terminal or port of the high voltage pulse generator be coupled to electrodes 232, and that the negative output terminal or port be coupled to electrodes 242. It is believed that the net polarity of the emitted ions is positive, e.g., more positive ions than negative ions are emitted. In any event, the preferred electrode assembly electrical coupling minimizes audible hum from electrodes 232 contrasted with reverse polarity (e.g., interchanging the positive and negative output port connections).

However, while generation of positive ions is conducive to a relatively silent air flow, from a health standpoint, it is desired that the output air flow be richer in negative ions, not positive ions. It is noted that in some embodiments, however, one port (preferably the negative port) of the high voltage pulse generator may in fact be the ambient air. Thus, electrodes in the second array need not be connected to the high voltage pulse generator using wire. Nonetheless, there will be an "effective connection" between the second array electrodes and one output port of the high voltage pulse generator, in this instance, via ambient air.

Figure 4A:
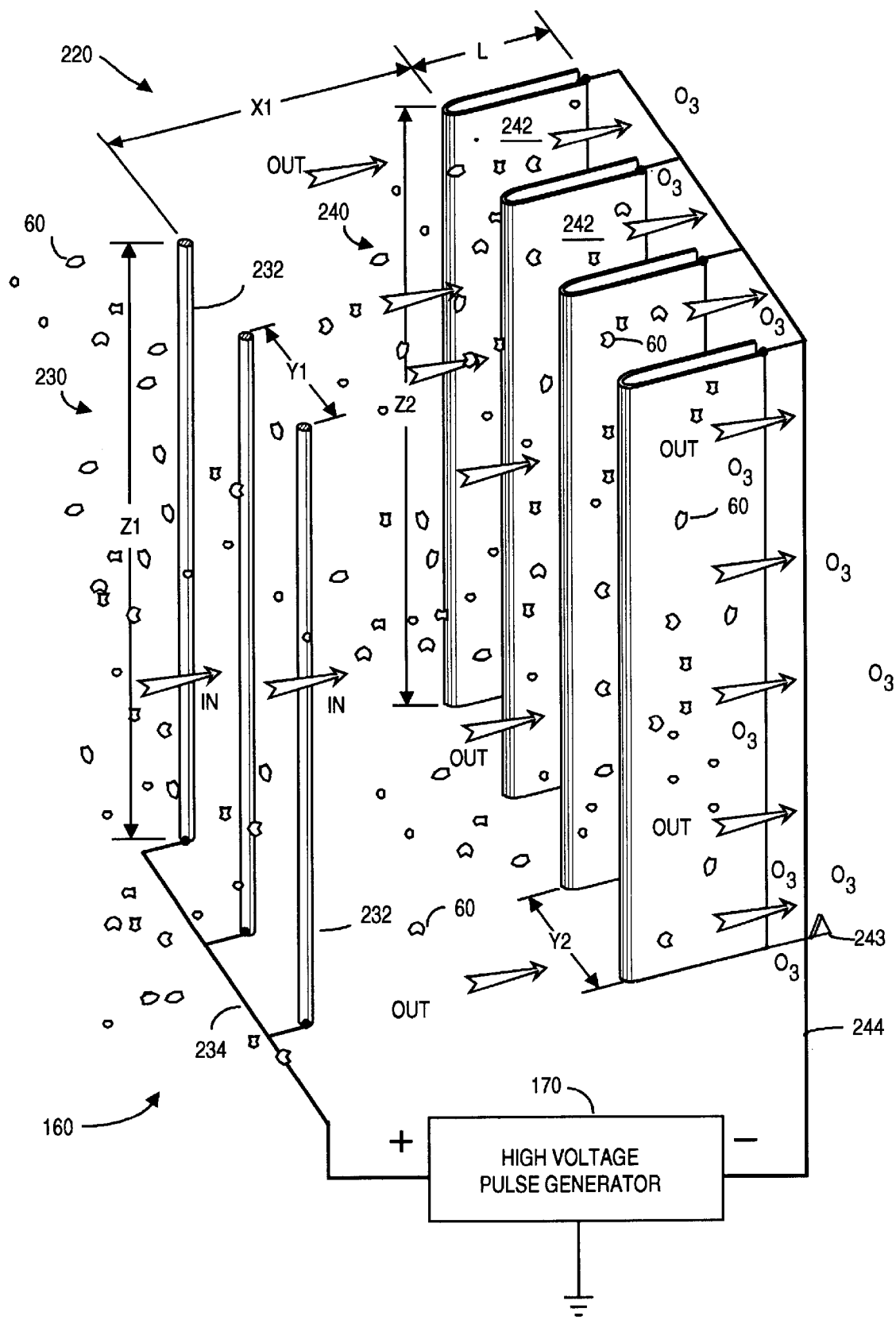
FIG. 4A is a perspective view showing a first embodiment for an electrode assembly, according to the present invention.
Figure 4B:
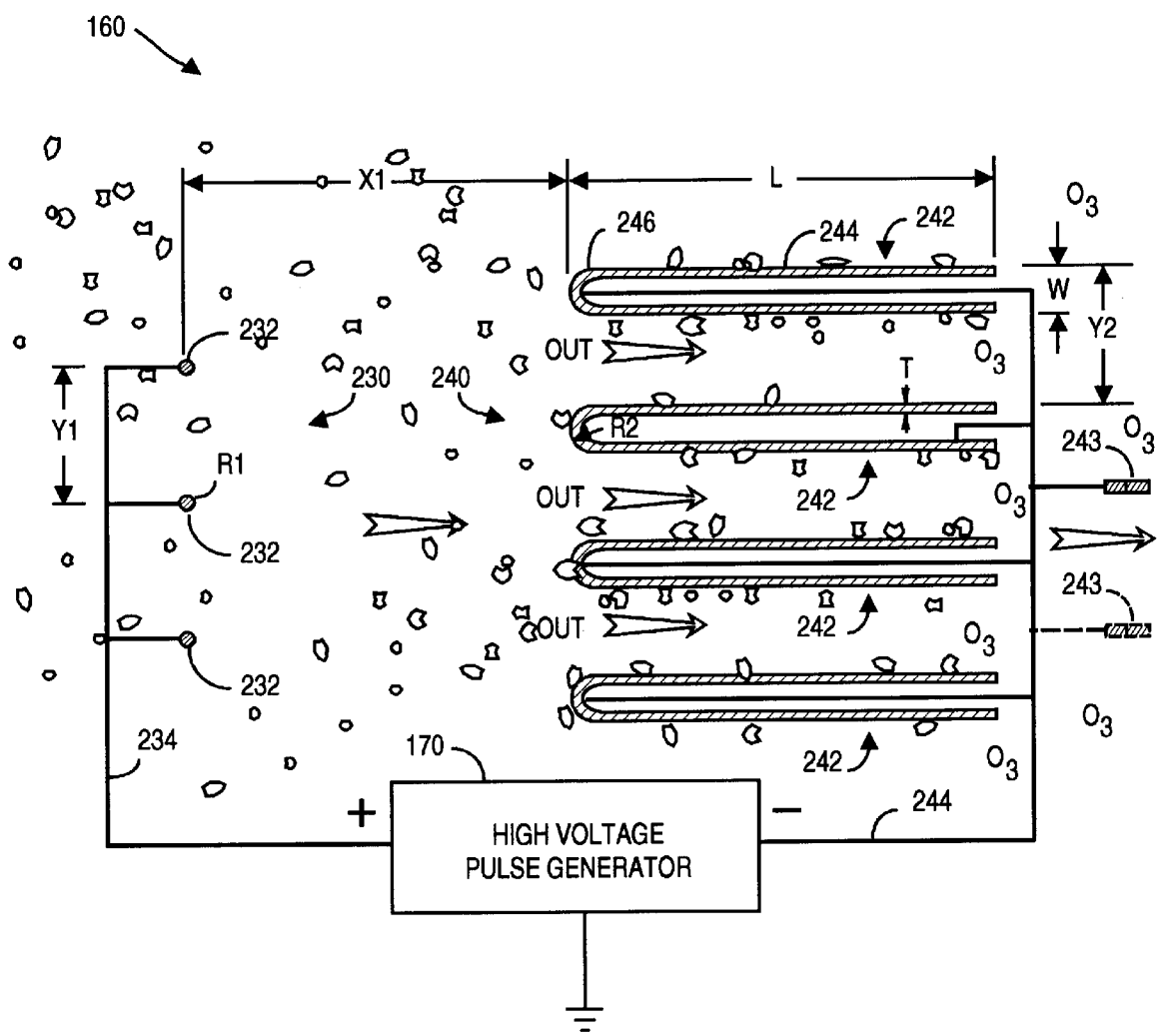
FIG. 4B is a plan view of the embodiment of FIG. 4A.

Turning now to the embodiments of FIGS. 4A and 4B, electrode assembly 220 comprises a first array 230 of wire electrodes 232, and a second array 240 of generally "U"-shaped electrodes 242. (This electrode assembly is what is depicted in FIG. 2C.) Preferably the number N1 of electrodes comprising the first array will preferably differ by one relative to the number N2 of electrodes comprising the second array. In many of the embodiments shown, N2>N1. However, if desired, in FIG. 4A, addition first electrodes 232 could be added at the out ends of array 230 such that N1<N2, e.g., five electrodes 232 compared to four electrodes 242. In the context of FIG. 2C, for example, if desired multiple arrays of electrode assemblies could be provided, a second array being disposed within housing section 106B.

Electrodes 232 are preferably lengths of tungsten wire, whereas electrodes 242 are formed from sheet metal, preferably stainless steel, although brass or other sheet metal could be used. The sheet metal is readily formed to define side regions 244 and bulbous nose region 246 for hollow elongated "U" shaped electrodes 242. While FIG. 4A depicts four electrodes 242 in second array 240 and three electrodes 232 in first array 230, as noted, other numbers of electrodes in each array could be used, preferably retaining a symmetrically staggered configuration as shown. It is seen in FIG. 4A that while particulate matter 60 is present in the incoming (IN) air, the outflow (OUT) air is substantially devoid of particulate matter, which adheres to the preferably large surface area provided by the second array electrodes (see FIG. 4B).

As best seen in FIG. 4B, the spaced-apart configuration between the arrays is staggered such that each first array electrode 232 is substantially equidistant from two second array electrodes 242. This symmetrical staggering has been found to be an especially efficient electrode placement. Preferably the staggering geometry is symmetrical in that adjacent electrodes 232 or adjacent electrodes 242 are spaced-apart a constant distance, Y1 and Y2 respectively. However, a non-symmetrical configuration could also be used, although ion emission and air flow would likely be diminished. Also, it is understood that the number of electrodes 232 and 242 may differ from what is shown.

In FIG. 4A, typically dimensions are as follows: diameter of electrodes 232 is about 0.08 mm, distances Y1 and Y2 are each about 16 mm, distance X1 is about 16 mm, distance L is about 20 mm, and electrode heights Z1 and Z2 are each about 1 m. The width W of electrodes 242 is preferably about 4 mm, and the thickness of the material from which electrodes 242 are formed is about 0.5 mm. Of course other dimensions and shapes could be used. It is preferred that electrodes 232 be small in diameter to help establish a desired high voltage field. On the other hand, it is desired that electrodes 232 (as well as electrodes 242) be sufficiently robust to withstand occasional cleaning.

Electrodes 232 in first array 230 are coupled by a conductor 234 to a first (preferably positive) output port of high voltage pulse generator 170, and electrodes 242 in second array 240 are coupled by a conductor 244 to a second (preferably negative) output port of generator 170. It is relatively unimportant where on the various electrodes electrical connection is made to conductors 234 or 244. Thus, by way of example FIG. 4B depicts conductor 244 making connection with some electrodes 242 internal to bulbous end 246, while other electrodes 242 make electrical connection to conductor 244 elsewhere on the electrode. Electrical connection to the various electrodes 242 could also be made on the electrode external surface providing no substantial impairment of the outflow airstream results.

Eventually electrodes in electrode array 240 will accumulate sufficient particulate matter to require cleaning. As noted, access to array 240 may be gained by opening a portion of the unit housing (see FIG. 2C). Alternatively, electrode assembly 230 (or at least electrode array 240) could be slidably removed from housing 106, for example via an openable hatch 118 in the housing (see FIG. 2C). To facilitate such removal, preferably one end of the various electrodes will fit against mating portions of wire or other conductors 234 or 244. For example, "cup-like" members can be affixed to wires 234 and 244 into which the free ends of the various electrodes fit when electrode array 220 is inserted completely into housing 106.

The ratio of the effective electric field emanating area of electrode 232 to the nearest effective area of electrodes 242 is at least about 15:1, and preferably is at least 20:1. Thus, in the embodiment of FIG. 4A and FIG. 4B, the ratio R2/R1≈2 mm/0.04 mm 50:1.

In this and the other embodiments to be described herein, ionization appears to occur at the smaller electrode(s) 232 in the first electrode array 230, with ozone production occurring as a function of high voltage arcing. For example, increasing the peak-to-peak voltage amplitude and/or duty cycle of the pulses from the high voltage pulse generator 170 can increase ozone content in the output flow of ionized air. If desired, user-control S2 can be used to somewhat vary ozone content by varying (in a safe manner) amplitude and/or duty cycle. Specific circuitry for achieving such control is known in the art and need not be described in detail herein.

Note the inclusion in FIGS. 4A and 4B of at least one output controlling electrode 243, preferably electrically coupled to the same potential as the second array electrodes. Electrode 243 preferably defines a pointed shape in side profile, e.g., a triangle. The sharp point on electrode(s) 243 causes generation of substantial negative ions (since the electrode is coupled to relatively negative high potential). These negative ions neutralize excess positive ions otherwise present in the output air flow, such that the OUT flow has a net negative charge. Electrode(s) 243 preferably are stainless steel, copper, or other conductor, and are perhaps 20 mm high and about 12 mm wide at the base.

Another advantage of including pointed electrodes 243 is that they may be stationarily mounted within the housing of unit 100, and thus are not readily reached by human hands when cleaning the unit. Were it otherwise, the sharp point on electrode(s) 243 could easily cause cuts. The inclusion of one electrode 243 has been found sufficient to provide a sufficient number of output negative ions, but more such electrodes may be included.

Figure 4C:
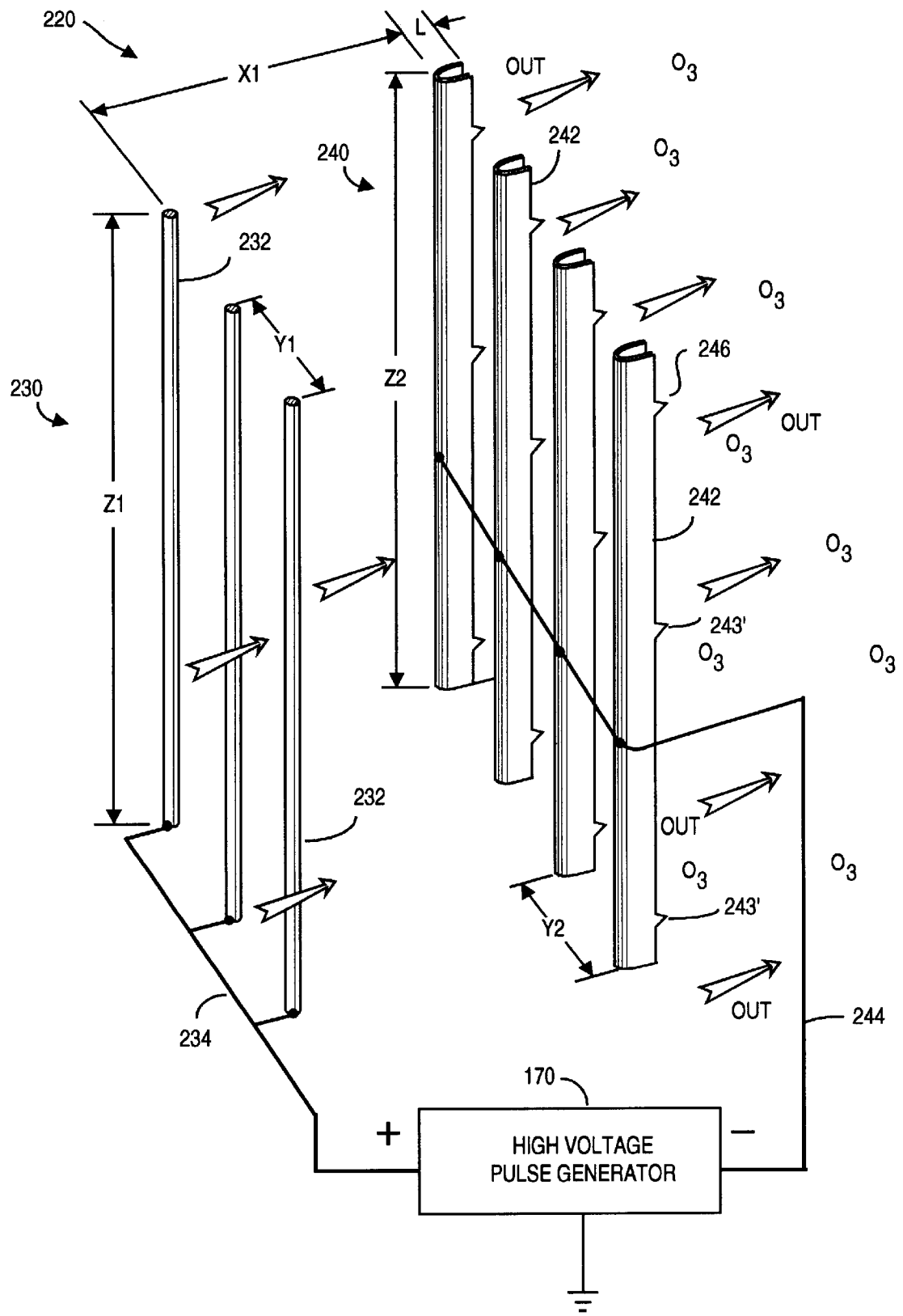
FIG. 4C is a perspective view showing a second embodiment for an electrode assembly, according to the present invention.

In the embodiment of FIGS. 4A and 4C, each "U"-shaped electrode 242 has two trailing edges that promote efficient kinetic transport of the outflow of ionized air and $O_3$. Note the inclusion on at least one portion of a trailing edge of a pointed electrode region 243'. Electrode region 243' helps promote output of negative ions, in the same fashion as was described with respect to FIGS. 4A and 4B. Note, however, the higher likelihood of a user cutting himself or herself when wiping electrodes 242 with a cloth or the like to remove particulate matter deposited thereon.

In FIG. 4C and the figures to follow, the particulate matter is omitted for ease of illustration. However, from what was shown in FIGS. 2A–4B, particulate matter will be present in the incoming air, and will be substantially absent from the outgoing air. As has been described, particulate matter 60 typically will be electronically precipitated upon the surface area of electrodes 242.

Figure 4D:
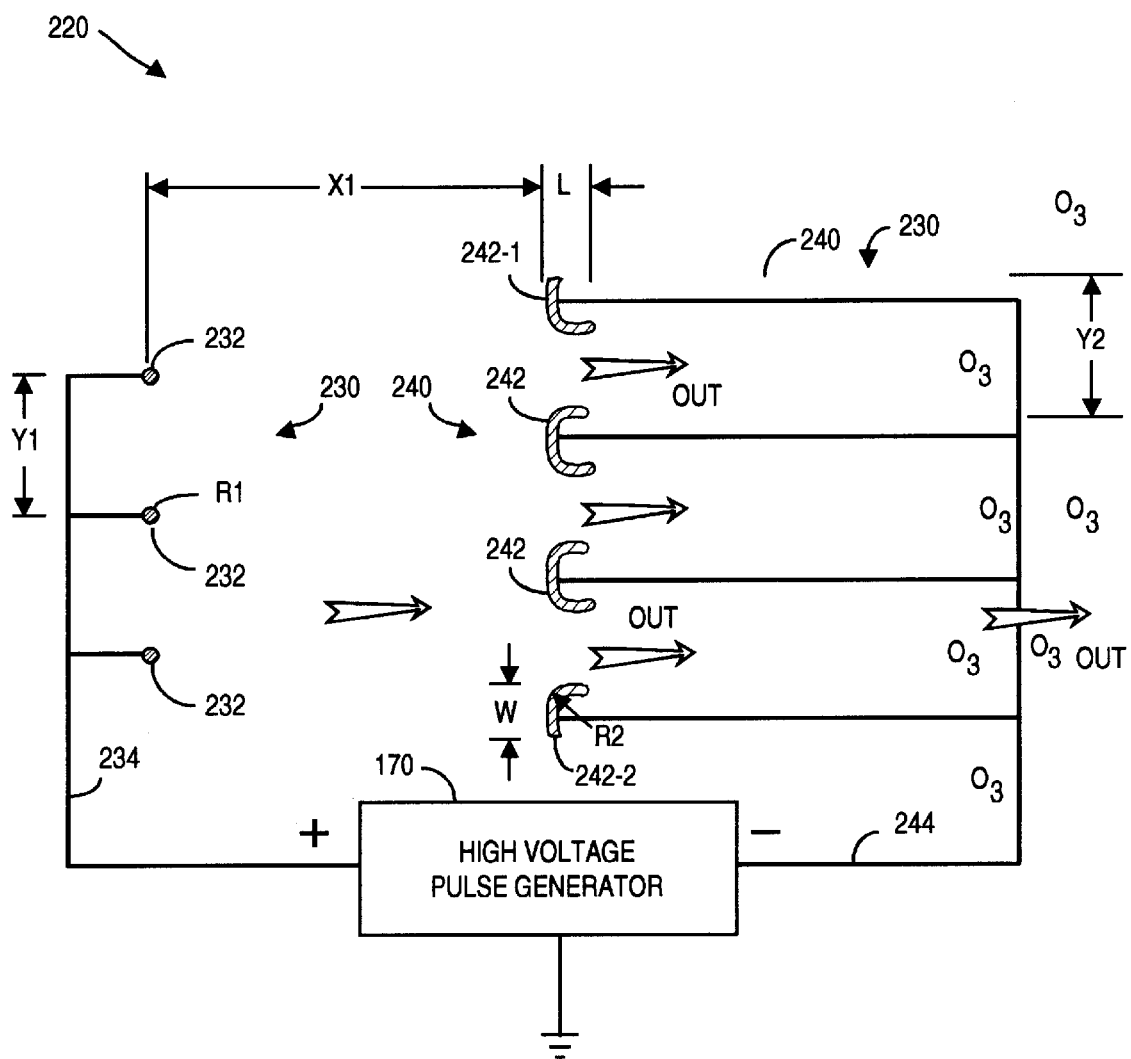
FIG. 4D is a plan view of a modified version of the embodiment of FIG. 4C.

Note that the embodiments of FIGS. 4C and 4D depict somewhat truncated versions of electrodes 242. Whereas dimension L in the embodiment of FIGS. 4A and 4B was about 20 mm, in FIGS. 4C and 4D, L has been shortened to about 8 mm. Other dimensions in FIG. 4C preferably are similar to those stated for FIGS. 4A and 4B. In FIGS. 4C and 4D, the inclusion of point-like regions 246 on the trailing edge of electrodes 242 seems to promote more efficient generation of ionized air flow. It will be appreciated that the configuration of second electrode array 240 in FIG. 4C can be more robust than the configuration of FIGS. 4A and 4B, by virtue of the shorter trailing edge geometry. As noted earlier, a symmetrical staggered geometry for the first and second electrode arrays is preferred for the configuration of FIG. 4C.

In the embodiment of FIG. 4D, the outermost second electrodes, denoted 242-1 and 242-2, have substantially no outermost trailing edges. Dimension L in FIG. 4D is preferably about 3 mm, and other dimensions may be as stated for the configuration of FIGS. 4A and 4B. Again, the R2/R1 ratio for the embodiment of FIG. 4D preferably exceeds about 20:1.

Figure 4E:
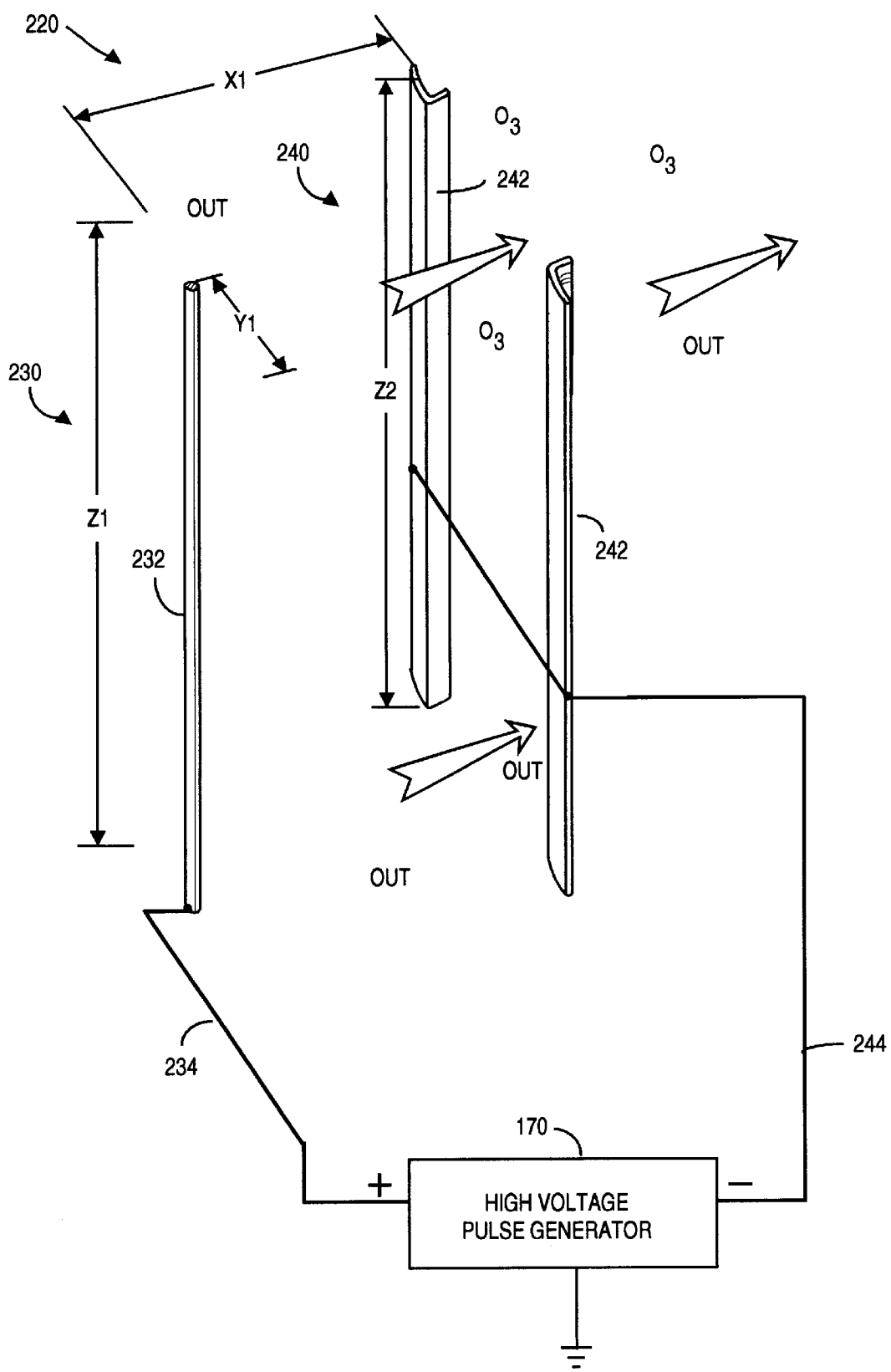
FIG. 4E is a perspective view showing a third embodiment for an electrode assembly, according to the present invention.
Figure 4F:
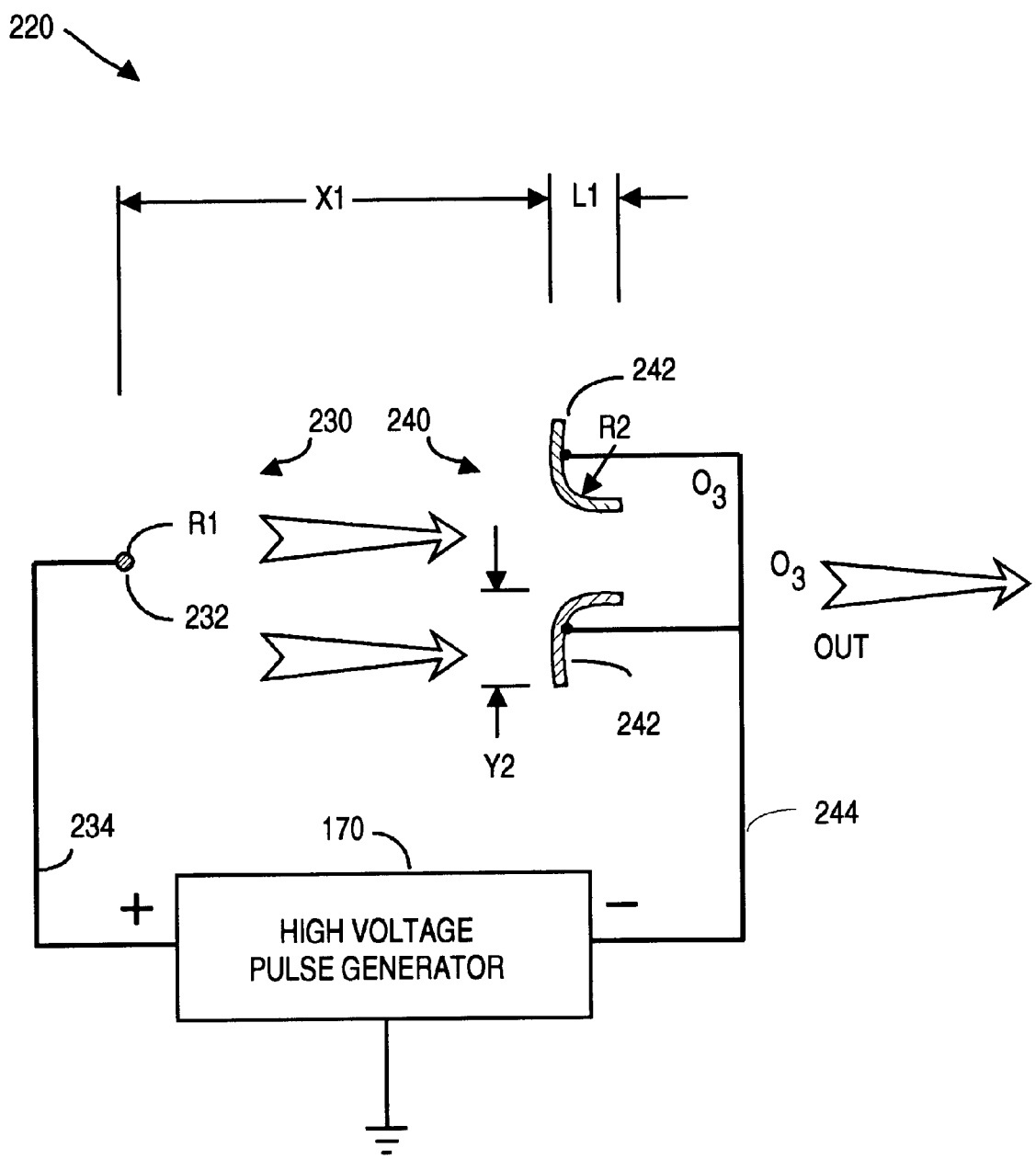
FIG. 4F is a plan view of the embodiment of FIG. 4E.

FIGS. 4E and 4F depict another embodiment of electrode assembly 220, in which the first electrode array comprises a single wire electrode 232, and the second electrode array comprises a single pair of curved "L"-shaped electrodes 242, in cross-section. Typical dimensions, where different than what has been stated for earlier-described embodiments, are X1≈12 mm, Y1≈6 mm, Y2≈5 mm, and L1≈3 mm. The effective R2/R1 ratio is again greater than about 20:1. The fewer electrodes comprising assembly 220 in FIGS. 4E and 4F promote economy of construction, and ease of cleaning, although more than one electrode 232, and more than two electrodes 242 could of course be employed. This embodiment again incorporates the staggered symmetry described earlier, in which electrode 232 is equidistant from two electrodes 242.

Figure 4G:
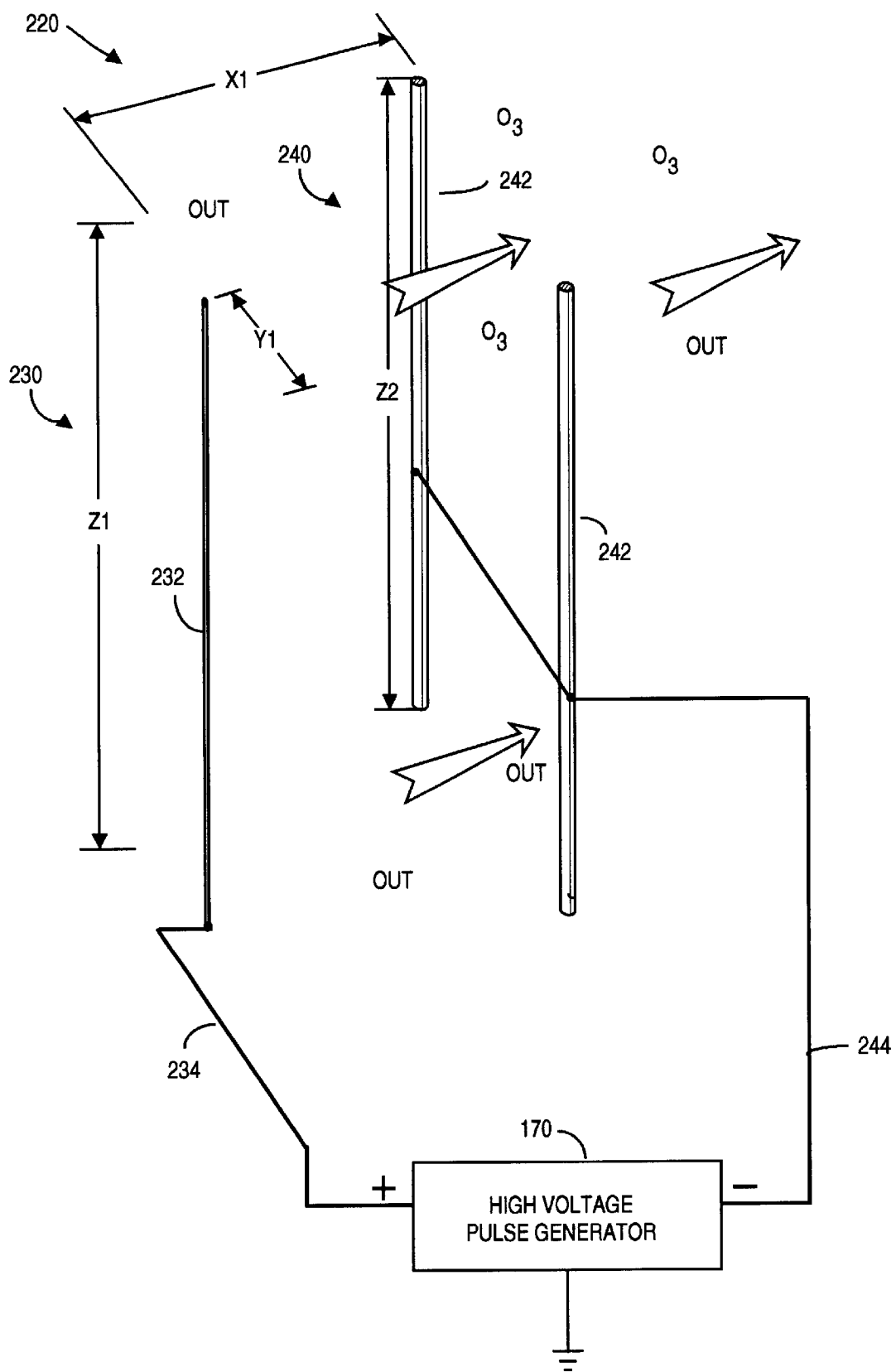
FIG. 4G is a perspective view showing a fourth embodiment for an electrode assembly, according to the present invention.
Figure 4H:
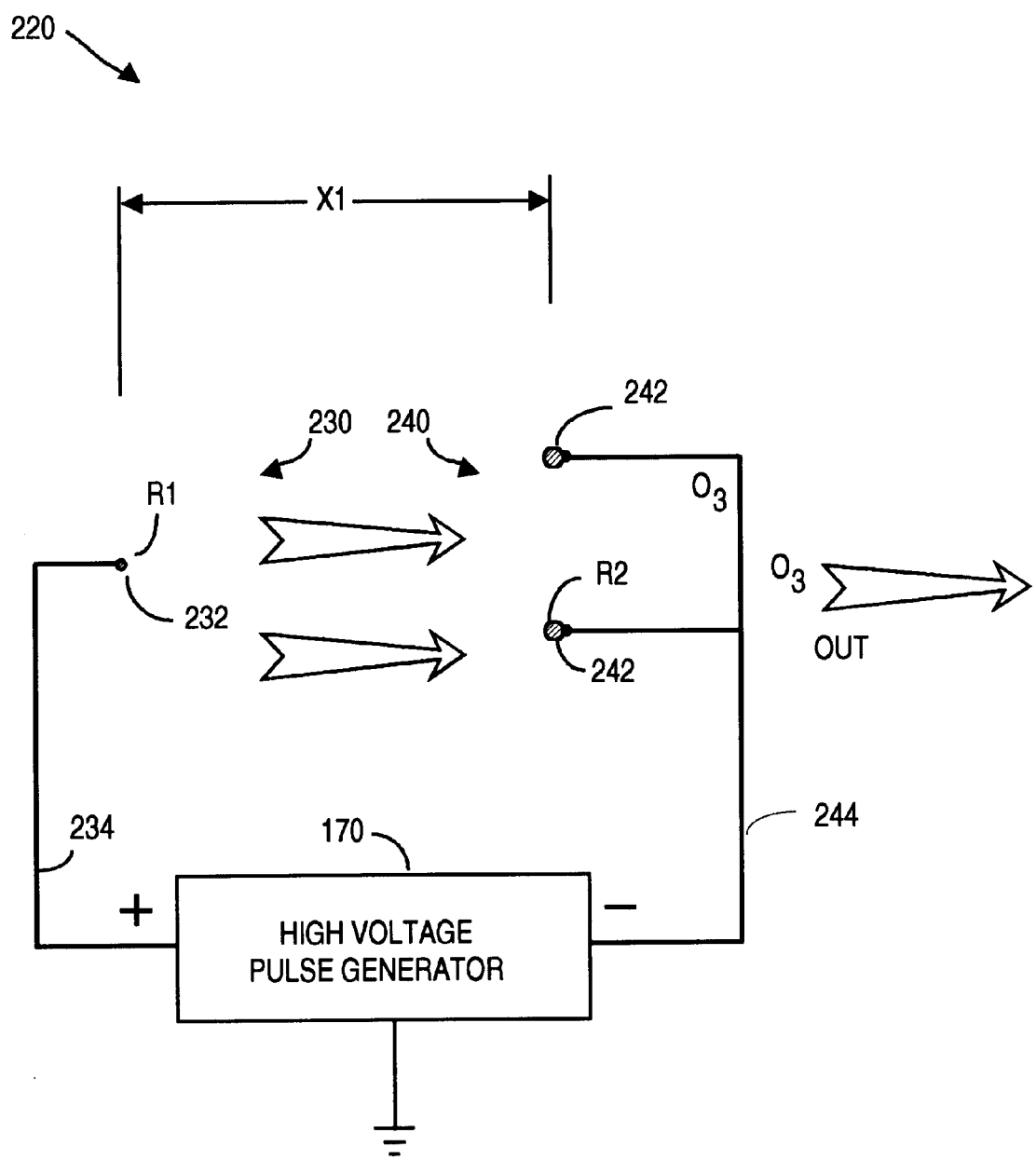
FIG. 4H is a plan view of the embodiment of FIG. 4G.

FIGS. 4G and 4H shown yet another embodiment for electrode assembly 220. In this embodiment, first electrode array 230 is a length of wire 232, while the second electrode array 240 comprises a pair of rod or columnar electrodes 242. As in embodiments described earlier herein, it is preferred that electrode 232 be symmetrically equidistant from electrodes 242. Wire electrode 232 is preferably perhaps 0.08 mm tungsten, whereas columnar electrodes 242 are perhaps 2 mm diameter stainless steel. Thus, in this embodiment the R2/R1 ratio is about 25:1. Other dimensions may be similar to other configurations, e.g., FIG. 4E, 4F. Of course electrode assembly 220 may comprise more than one electrode 232, and more than two electrodes 242.

Figure 4I:
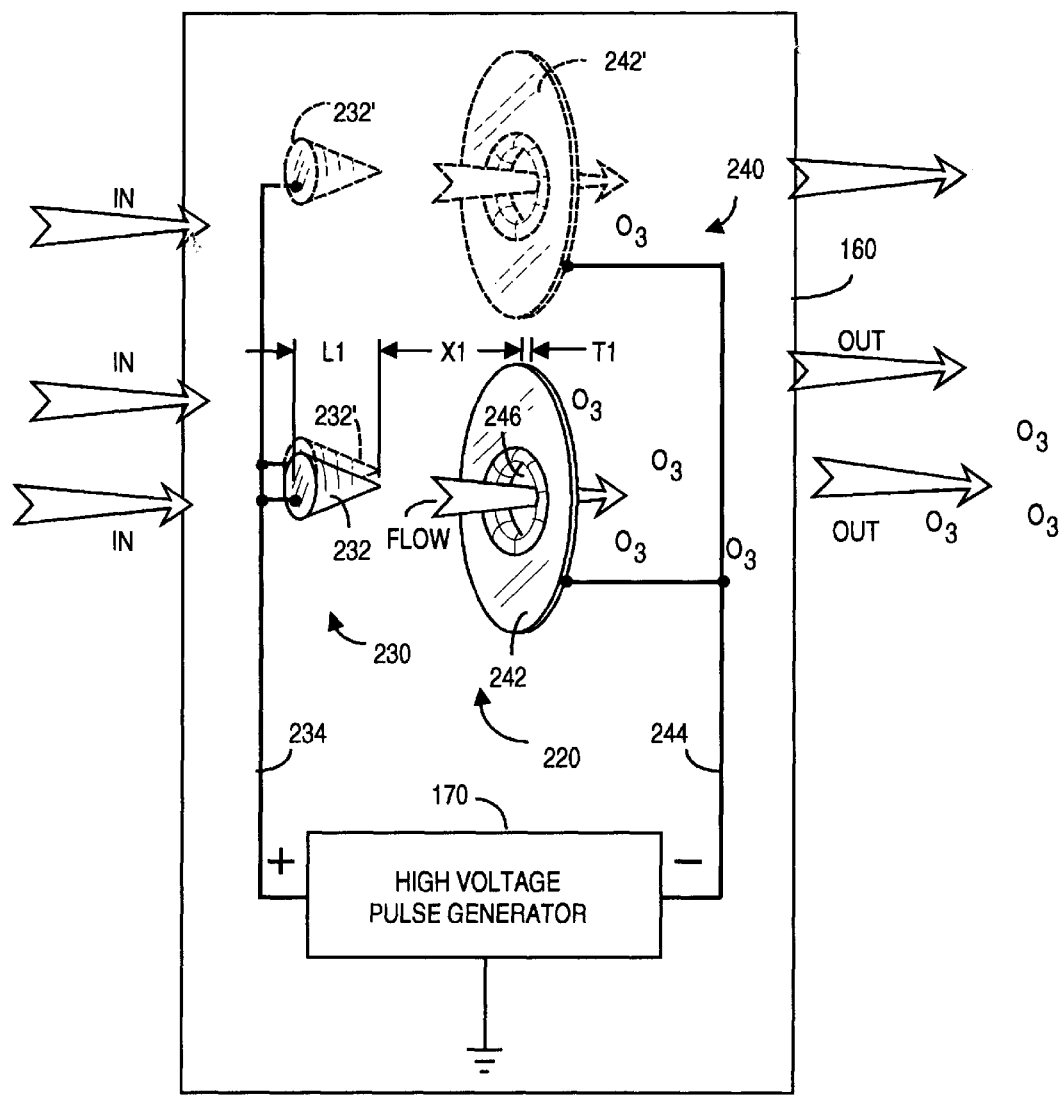
FIG. 4I is a perspective view depicting a fifth embodiment for an electrode assembly, according to the present invention.
Figure 4J:
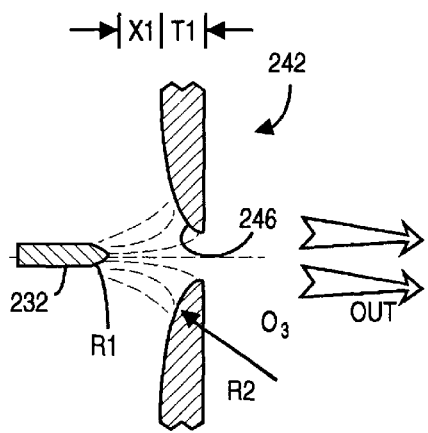
FIG. 4J is a detailed cross-sectional view of a portion of the embodiment of FIG. 4I.

An especially preferred embodiment is shown in FIG. 4I and FIG. 4J, which embodiment is also depicted in FIGS. 2B and 2D. In these figures, the first electrode assembly comprises a single pin-like element 232 disposed coaxially with a second electrode array that comprises a single ring-like electrode 242 having a rounded inner opening 246. However, as indicated by phantom elements 232', 242', electrode assembly 220 may comprise a plurality of such pin-like and ring-like elements. Preferably electrode 232 is tungsten, and electrode 242 is stainless steel.

Typical dimensions for the embodiment of FIG. 4I and FIG. 4J are L1≈10 mm, X1≈9.5 mm, T≈0.5 mm, and the diameter of opening 246 is about 12 mm. Dimension L1 preferably is sufficiently long that upstream portions of electrode 232 (e.g., portions to the left in FIG. 4I) do not interfere with the electrical field between electrode 232 and the collector electrode 242. However, as shown in FIG. 4J, the effect R2/R1 ratio is governed by the tip geometry of electrode 232. Again, in the preferred embodiment, this ratio exceeds about 20:1. Lines drawn in phantom in FIG. 4J depict theoretical electric force field lines, emanating from emitter electrode 232, and terminating on the curved surface of collector electrode 246. Preferably the bulk of the field emanates within about ±45° of coaxial axis between electrode 232 and electrode 242. On the other hand, if the opening in electrode 242 and/or electrode 232 and 242 geometry is such that too narrow an angle about the coaxial axis exists, air flow will be unduly restricted.

One advantage of the ring-pin electrode assembly configuration shown in FIG. 4I is that the flat regions of ring-like electrode 242 provide sufficient surface area to which particulate matter 60 entrained in the moving air stream can attach, yet be readily cleaned.

Further, the ring-pin configuration advantageously generates more ozone than prior art configurations, or the configurations of FIGS. 4A–4H. For example, whereas the configurations of FIGS. 4A–4H may generate perhaps 50 ppb ozone, the configuration of FIG. 4I can generate about 2,000 ppb ozone.

Figure 4K:
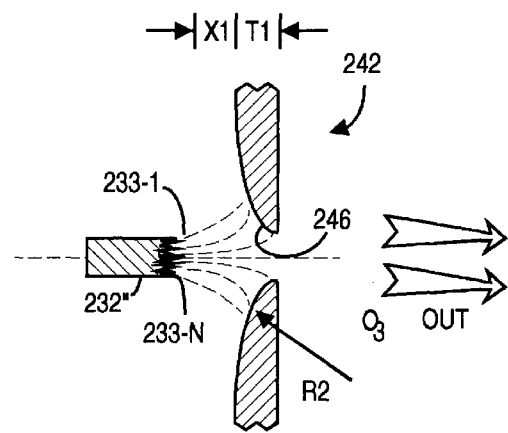
FIG. 4K is a detailed cross-sectional view of a portion of an alternative to the embodiment of FIG. 4I.

Nonetheless it will be appreciated that applicants' first array pin electrodes may be utilized with the second array electrodes of FIGS. 4A–4H. Further, applicants' second array ring electrodes may be utilized with the first array electrodes of FIGS. 4A–4H. For example, in modifications of the embodiments of FIGS. 4A–4H, each wire or columnar electrode 232 is replaced by a column of electrically series-connected pin electrodes (e.g., as shown in FIGS. 4I–4K), while retaining the second electrode arrays as depicted in these figures. By the same token, in other modifications of the embodiments of FIGS. 4A–4H, the first array electrodes can remain as depicted, but each of the second array electrodes 242 is replaced by a column of electrically series-connected ring electrodes (e.g., as shown in FIGS. 4I–4K).

In FIG. 4J, a detailed cross-sectional view of the central portion of electrode 242 in FIG. 4I is shown. As best seen in FIG. 4J, curved region 246 adjacent the central opening in electrode 242 appears to provide an acceptably large surface area to which many ionization paths from the distal tip of electrode 232 have substantially equal path length. Thus, while the distal tip (or emitting tip) of electrode 232 is advantageously small to concentrate the electric field between the electrode arrays, the adjacent regions of electrode 242 preferably provide many equidistant inter-electrode array paths. A high exit flowrate of perhaps 90 feet/minute and 2,000 ppb range ozone emission attainable with this configuration confirm a high operating efficiency.

In FIG. 4K, one or more electrodes 232 is replaced by a conductive block 232" of carbon fibers, the block having a distal surface in which projecting fibers 233-1, . . . 233-N take on the appearance of a "bed of nails". The projecting fibers can each act as an emitting electrode and provide a plurality of emitting surfaces. Over a period of time, some or all of the electrodes will literally be consumed, whereupon graphite block 232" will be replaced. Materials other than graphite may be used for block 232" providing the material has a surface with projecting conductive fibers such as 233-N.

As described, the net output of ions is influenced by placing a bias element (e.g., element 243) near the output stream and preferably near the downstream side of the second array electrodes. If no ion output were desired, such an element could achieve substantial neutralization. It will also be appreciated that the present invention could be adjusted to produce ions without producing ozone, if desired.

Modifications and variations may be made to the disclosed embodiments without departing from the subject and spirit of the invention as defined by the following claims. Although the preferred embodiments are sized to fit within hand-holdable housings, it is understood that different sizes and configurations may instead be used.

What is claimed is:

1. A self-contained hand-held sized electro-kinetic air transporter-conditioner adapted for use with an animal container, comprising:

a housing defining at least one vent;

means for attaching said housing to a portion of said animal container;

a self-contained ion generator, disposed within said housing, including a high voltage generator having first and second output ports, one of which ports may be at a same potential as ambient air, that outputs a signal whose duty cycle can be about 10% to about 100%; and an electrode assembly, effectively coupled between said output ports of said generator, comprising a first electrode array, and a second electrode array;

wherein said ion generator outputs an electrostatic flow in a downstream direction toward said second electrode array, said electrostatic flow including at least one of ionized air and ozone;

wherein at least some particulate matter entrained in said flow collects on at least a region of said second electrode array.

2. The transporter-conditioner of claim 1, wherein:

said animal container is an animal litter box; and further including means for detecting animal odor adjacent said lifter box and for energizing said ion generator when detected said odor exceeds a predetermined threshold.

3. The transporter-conditioner of claim 1, wherein said high voltage generator has a characteristic selected from a group consisting of (a) said high voltage generator provides a first potential measurable relative to ground to said first electrode array and provides a second potential measurable relative to ground to said second electrode array, and (b) said high voltage generator provides a first positive potential measurable relative to ground to said first electrode array and provides a second negative potential measurable relative to ground to said second electrode array.

4. The transporter-conditioner of claim 1, wherein said animal container is selected from a group consisting of (i) an animal kennel, (ii) an animal house, and (iii) an animal litter box.

5. The transporter-conditioner of claim 1, wherein:

said first electrode array includes at least one metal wire electrode; and said second electrode array includes at least two electrically conductive electrodes that in cross-section define a hollow "U"-shape having a bulbous nose region and first and second trailing edge regions;

the "U"-shaped electrodes being disposed such that said bulbous nose regions face said metal wire electrode and are equidistant therefrom.

6. The transporter-conditioner of claim 5, wherein an electrode in said second electrode array has at least one characteristic selected from a group consisting of (i) a portion of one trailing edge region is longer than a remaining trailing edge region on said electrode, (ii) said trailing edge region defines at least one pointed projection facing downstream, and (iii) a ratio of effective radius of an electrode in said second electrode array to effective radius of said metal wire electrode exceeds about 15:1.

7. The transporter-conditioner of claim 1, wherein:

said first electrode array includes at least one electrode selected from a group consisting of (i) an electrically conductive tapered pin-shaped electrode facing in a downstream direction, (ii) an electrically conductive electrode with a pointed tip facing in a downstream direction, and (iii) a portion of conductive material having a end defining a plurality of projecting conductive fibers facing in a downstream direction; and said second electrode array includes at least one electrically conductive member through which there is defined at least one substantially circular opening disposed generally coaxial with and in a downstream direction from a downstream direction facing portion of said electrode in said first electrode array, said electrically conductive member having a surface that faces said first electrode array and transitions smoothly and continuously to form a skirt-like region surrounding a periphery of said substantially circular opening.

8. The transporter-conditioner of claim 7, wherein said first electrode array includes at least one pin-shaped electrode, and said second electrode array has at least one characteristic selected from a group consisting of (a) said electrically conductive member defines in cross-section a tapered region terminating towards said circular opening, (b) said electrically conductive member defines in cross-section a rounded region terminating towards said circular opening, (c) said electrically conductive member defines in cross-section a rounded profile terminating in said circular opening, (d) a ratio of effective radius of said electrically conductive member to effective radius of said pin-shaped electrode exceeds about 15:1, (e) said pin-shaped electrode includes tungsten, (f) said pin-shaped electrode includes stainless steel, (g) said pin-shaped electrode includes projecting fibers of carbon, and (h) said electrically conductive member includes stainless steel.

9. The transporter-conditioner of claim 1, wherein:

said first electrode array includes at least one metal wire electrode; and said second electrode array includes at least two electrically conductive electrodes that in cross-section define an "L"-shape having a curved nose region;

the "L"-shaped electrodes being disposed such that said curved nose regions face said metal wire electrode and are equidistant therefrom.

10. The transporter-conditioner of claim 1, wherein:

said first electrode array includes at least one metal wire electrode; and said second electrode array includes at least two rod-shaped electrically conductive electrodes including curved nose regions;

said rod-shaped electrodes being disposed such that said curved nose regions face said metal wire electrode and are equidistant therefrom, and a ratio of radius of one of said rod-shaped electrodes to radius of said wire electrode exceeds about 15:1.

11. The transporter-conditioner of claim 1, further including a bias electrode for determining net polarity of ions generated by said transporter-conditioner.

12. A self-contained hand-held sized electro-kinetic air transporter-conditioner adapted for use with an animal container, comprising:

a housing defining at least one vent;

means for attaching said housing to a portion of said animal container;

a high voltage generator, disposed within said housing, having first and second output ports, one of which ports may be at a same potential as ambient air, that outputs a signal whose duty cycle can be about 10% to about 100%; and an electrode assembly, effectively coupled between said output ports of said generator, comprising a first electrode array that includes at least one electrically conductive electrode having a pointed tip aimed generally in a downstream direction, and a second electrode array that includes at least one electrically conductive member through which there is defined at least one substantially circular opening disposed generally coaxial with and in a downstream direction from said pointed tip of said electrically conductive electrode, said electrically conductive member having a surface that faces said first electrode array and transitions smoothly and continuously to surround a periphery of said substantially circular opening;

wherein application of high voltage across said electrode assembly results in an output electrostatic flow in a downstream direction toward said second electrode array, said electrostatic flow including at least one of ionized air and ozone.

13. The electro-kinetic air transporter-conditioner of claim 12, wherein said animal container is an animal litter box; and further including means for detecting animal odor adjacent said box and for energizing said transporter-conditioner when detected said odor exceeds a predetermined threshold.

14. The electro-kinetic air transporter-conditioner of claim 13, wherein:

said means for energizing operates in a mode selected from a group consisting of (i) open loop such that said transporter-conditioner is energized for a predetermined time, and (ii) closed loop such that said transporter-conditioner is energized as a function of time required to reduce sensed said odor below a desired threshold.

15. The electro-kinetic air transporter-conditioner of claim 12, wherein a ratio of effective radius of an electrode in said second electrode array to effective radius of an electrode in said first electrode array exceeds about 15:1.

16. The electro-kinetic air transporter-conditioner of claim 12, wherein said animal container is selected from a group consisting of (i) an animal kennel, (ii) an animal house, and (iii) an animal litter box.

17. The electro-kinetic air transporter-conditioner of claim 12, wherein:

said first electrode array includes at least one electrode selected from a group consisting of (i) an electrically conductive tapered pin-shaped electrode, (ii) a pin-shaped electrode, (iii) a pointed electrode, and (iv) a portion of conductive material having a end defining a plurality of projecting conductive fibers.

18. The electro-kinetic air transporter-conditioner of claim 12, wherein said second electrode array has at least one characteristic selected from a group consisting of (a) said electrically conductive member defines in cross-section a tapered region terminating towards said circular opening, (b) said electrically conductive member defines in cross-section a rounded region terminating towards said circular opening, (c) said electrically conductive member defines in cross-section a rounded profile terminating in said circular opening, and (d) a ratio of effective radius of said electrically conductive member to effective radius of an electrode in said first array exceeds about 15:1.

19. The electro-kinetic air transporter-conditioner of claim 12, wherein:

said second electrode array includes at least one electrode selected from a group consisting of (i) an electrically conductive ring-shaped electrode, (ii) a loop of electrically conductive material, and (iii) a periphery of electrically conductive material.

20. The electro-kinetic air transporter-conditioner of claim 12, wherein:

an electrode in said first array includes at least one characteristic selected from a group consisting of (i) said electrode includes tungsten, (ii) said electrode includes stainless steel, and (iii) said electrode includes projecting fibers of carbon.

21. The electro-kinetic air transporter-conditioner of claim 18, wherein said second electrode array includes at least one electrode selected from a group consisting of (i) an electrically conductive ring-shaped electrode, (ii) a loop of electrically conductive material, and (iii) a periphery of electrically conductive material.

22. The electro-kinetic air transporter-conditioner of claim 19, wherein said second electrode array includes at least one electrode selected from a group consisting of (i) an electrically conductive ring-shaped electrode, (ii) a loop of electrically conductive material, and (iii) a periphery of electrically conductive material.

* * * * *

UNITED STATES PATENT AND TRADEMARK OFFICE
CERTIFICATE OF CORRECTION

PATENT NO. : 6,312,507 B1  Page 1 of 1
DATED : November 6, 2001
INVENTOR(S) : Taylor et al.

It is certified that error appears in the above-identified patent and that said Letters Patent is hereby corrected as shown below:

<u>Column 3,</u>
FIG. 2A, please delete "is an" and insert -- is a --.

<u>Column 13,</u>
Line 4, please delete "lifter" and insert -- litter --.

Signed and Sealed this

Fourth Day of June, 2002

*Attest:*

*Attesting Officer*

JAMES E. ROGAN
*Director of the United States Patent and Trademark Office*